S. S. BARRIE,
Assignor, by mesne assignments, to H. E. SHAFFER.
LAMP BRACKET.
No. 10,167. Reissued July 25, 1882.
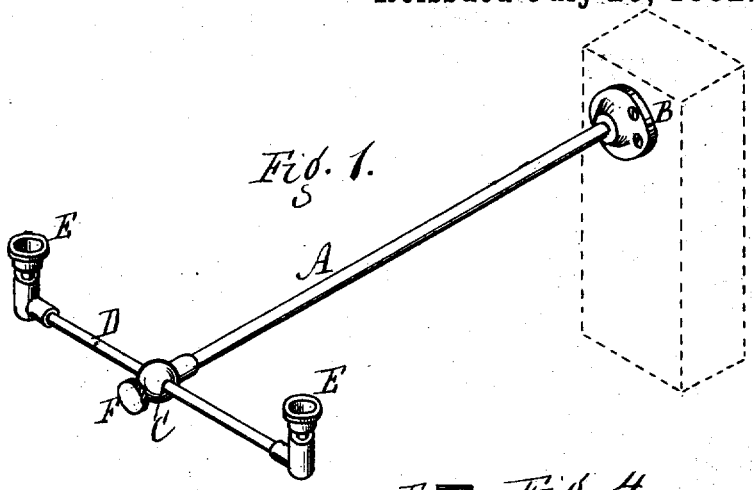
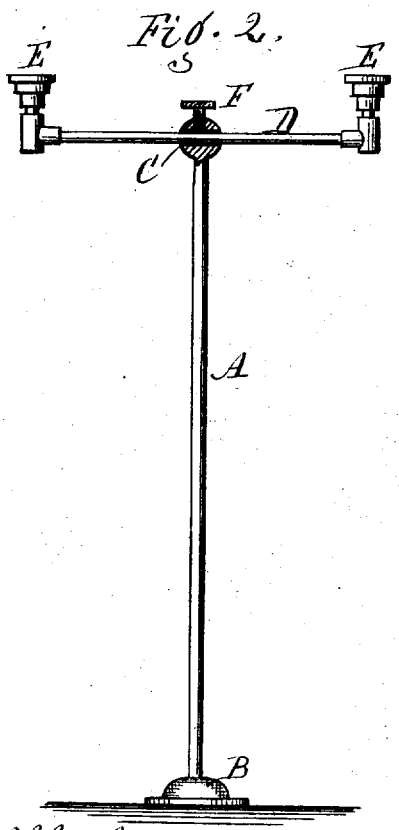
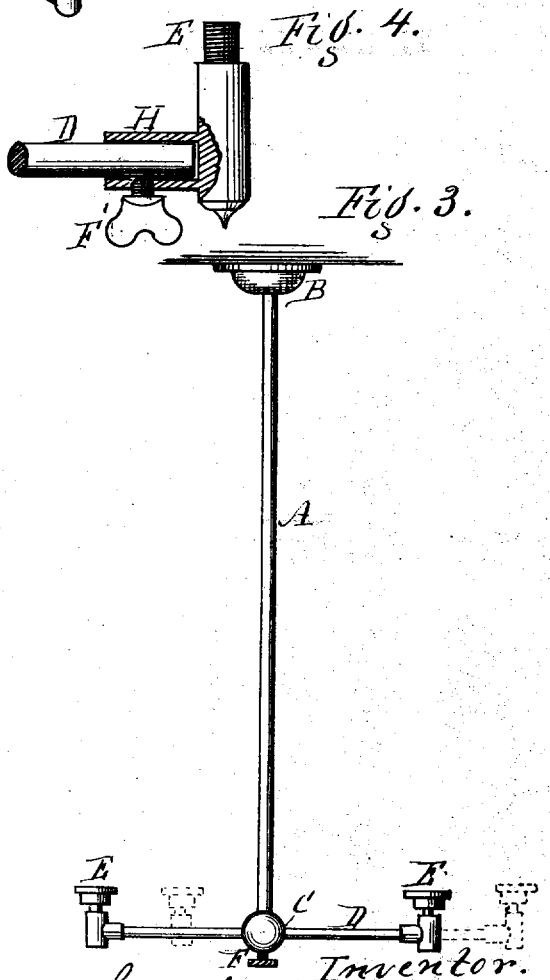
Attest.
Chas. F. Simon
Wm. L. Pahmy.
Inventor.
Saull S. Barrie,
by R. T. Osgood,
Atty.
N. PETERS, Photo-Lithographer, Washington, D. C.

UNITED STATES PATENT OFFICE.

SAMUEL S. BARRIE, OF BROOKLYN, ASSIGNOR, BY MESNE ASSIGNMENTS, TO H. E. SHAFFER, OF ROCHESTER, NEW YORK.

LAMP-BRACKET.

SPECIFICATION forming part of Reissued Letters Patent No. 10,167, dated July 25, 1882.

Original No. 184,572, dated November 21, 1876. Application for reissue filed August 24, 1881.

*To all whom it may concern:*

Be it known that I, SAMUEL S. BARRIE, now of the city of Brooklyn, county of Kings, and State of New York, have invented an Improved Convertible Standard, Bracket, and Pendant for Lamps, Candles, Tapers, and other Illuminating Articles; and I do hereby declare that the following is a full, clear, and exact description of the same, reference being had to the accompanying drawings, which form part of this specification.

My invention has for its object the production of a support for candles, lamps, &c., which may be fastened either upon desks, tables, the upper sides of the horizontal parts of furniture or buildings, or upon the under sides of ceilings or horizontal projections, upon vertical side walls, or upon surfaces inclined either from a vertical or horizontal position, while at the same time the lamp or candle holders or parts used to hold the illuminating articles may be adjusted and held in a vertical position.

My invention consists in a novel combination of a reversible and adjustable holder or holders for lamps, candles, or other illuminating articles with a support, the combination forming a convertible standard, bracket, and pendant for the said illuminating articles, said holders being provided with fastenings, by which they may be firmly held in position when adjusted.

Figure 1 in the accompanying drawings represents my convertible lamp standard, bracket, and pendant when adjusted for use and used as a bracket. Fig. 2 represents the same adjusted for use and used as a standard. Fig. 3 represents the same adjusted for use and used as a pendant. Fig. 4 illustrates one of the ways in which my invention may be carried out.

A is a support, provided with a foot, B, by which the device is attached to an upper, under, vertical, or inclined surface, the attachment being usually made by screws, said support with its attachments forming a standard, bracket, or pendant, according as it is applied in one or other of the ways specified. The said support or rod A is usually made to be shortened or lengthened by telescoping a part of the same into another part; but this forms no part of my invention.

In one mode of carrying out my invention the end of the support or rod A which is farthest from the foot B is slightly enlarged, and has formed therein a transverse hole, C, passing through the enlarged portion. Through the said hole C is passed the rod D, to which the holders E for lamps, candles, or other illuminating articles are attached, and when the said rod D is adjusted relatively to the arm A into any of the positions shown in Figs. 1, 2, and 3 in full or dotted outline, it may be fixed in such position by use of a set-screw, F, or by a pin, key, wedge, or other suitable clamping device.

In another method of carrying out my invention the rod D is rigidly or movably attached to the arm A, while the lamp-holder E, Fig. 4, is provided with a sleeve, H, Fig. 4, which is slipped over the end of the rod D, said sleeve being provided with a set-screw, F′, Fig. 4, or other suitable fastening. The lamp-holder is thus made reversible and adjustable. Instead of single lamp or candle holders, two or more holders may be attached to a common stem and made reversible and adjustable together.

By this construction I secure a simple, cheap, and very useful fixture, which may be indiscriminately attached to the tops of counters or desks, to the sides of pillars or walls, or to the under sides of galleries and the upper ceilings of halls and churches.

Having described my invention, I claim—

The combination of the support, a reversible and adjustable lamp or candle holder, and a fastening device for securing the lamp or candle holder at any adjustment, as set forth.

In witness whereof I have hereunto set my hand this 16th day of June, 1881.

SAMUEL S. BARRIE.

Witnesses:

GEO. W. WOODWARD,

H. E. SHAFFER.